(12) United States Patent
Nainar et al.

(10) Patent No.: US 12,730,917 B2
(45) Date of Patent: Sep. 8, 2026

(54) SYSTEMS AND METHODS FOR INJECTING FAILURES ACROSS A STACK

(71) Applicant: Cisco Technology, Inc., San Jose, CA (US)

(72) Inventors: Nagendra Kumar Nainar, Morrisville, NC (US); Cesar Obediente, Apex, NC (US); David John Zacks, Vancouver (CA); Carlos M. Pignataro, Cary, NC (US); Thomas Szigeti, Vancouver (CA); Craig T. Hill, Sterling, VA (US)

(73) Assignee: Cisco Technology, Inc., San Jose, CA (US)

( * ) Notice: Subject to any disclaimer, the term of this patent is extended or adjusted under 35 U.S.C. 154(b) by 260 days.

(21) Appl. No.: 18/339,035

(22) Filed: Jun. 21, 2023

(65) Prior Publication Data

US 2024/0427918 A1 Dec. 26, 2024

(51) Int. Cl.
*G06F 21/55* (2013.01)
*G06F 21/51* (2013.01)
*G06F 21/62* (2013.01)
*G06F 21/53* (2013.01)

(52) U.S. Cl.
CPC ................................ *G06F 21/6218* (2013.01)

(58) Field of Classification Search
None
See application file for complete search history.

(56) References Cited

U.S. PATENT DOCUMENTS 7,647,522 B2 * 1/2010 Meijer ................ H04L 41/0659 714/3
8,024,772 B1 * 9/2011 Yehuda ................ H04L 41/069 726/1
10,528,450 B2 * 1/2020 Hassan ............... G06F 11/3616
12,001,980 B2 * 6/2024 Gamliel .................... G06F 9/54
2002/0103663 A1 8/2002 Bankier et al.
2017/0264639 A1 * 9/2017 Sama .................... H04L 63/029
2020/0067789 A1 * 2/2020 Khuti ................. H04L 41/5009
2021/0263836 A1 8/2021 Singh et al.
2021/0374039 A1 12/2021 Rajagopalan et al.
2022/0141304 A1 * 5/2022 Gefen .................. H04L 67/567 709/219
2022/0224718 A1 7/2022 Sarda et al.
2023/0127654 A1 * 4/2023 Sun .................... G06F 16/3329 706/46

OTHER PUBLICATIONS

Static-Analysis-Based Solutions to Security Challenges in Cloud-Native Systems: Systematic Mapping Study. Rahaman. (Year: 2023).*

(Continued)

*Primary Examiner* — Venkat Perungavoor
(74) *Attorney, Agent, or Firm* — Baker Botts L.L.P.

(57) ABSTRACT

In one embodiment, a method includes generating a security policy and converting the security policy into a chaos hypothesis. The method also includes initiating execution of the chaos hypothesis across a plurality of microservices within a technology stack. The method further includes receiving metrics associated with the execution of the chaos hypothesis across the plurality of microservices within the technology stack.

20 Claims, 8 Drawing Sheets

(56) References Cited

OTHER PUBLICATIONS

Machine Learning Applied To Chaos Engineering. Serrato. (Year: 2022).*
A Review of Resilience Testing in Microservices Architectures: Implementing Chaos Engineering for Fault Tolerance and System Reliability. Mailewa. IEEE. (Year: 2025).*
Aloe: Fault-Tolerant Network Management and Orchestration Framework for IoT Applications. Chattopadhyay et al. IEEE. (Year: 2020).*
Chaos Testing: A Proactive Framework for System Resilience in Distributed Architectures. Pareek. IJSR. (Year: 2024).*
Hero : On the Chaos When PATH Meets Modules. Wang et al. IEEE. (Year: 2021).*
Adrian Hornsby, "Chaos Engineering—Part 3; Failure Injection—Tools and Methods", dated Oct. 31, 2019, 27 pages.

* cited by examiner

| Cookies 240 | Semantics 250 |
|---|---|
| 2cfdda5b 240a | Insert Cookie (abc1234) 250a |
| 3ffgf45a 240b | Delay Request (10 seconds) 250b |
| 4gjh56fa 240c | Tamper (Session ID) 250c |
| • • • 240n | • • • 250n |

SYSTEMS AND METHODS FOR INJECTING FAILURES ACROSS A STACK

TECHNICAL FIELD

The present disclosure relates generally to application security, and more specifically to systems and methods for injecting failures across a stack.

BACKGROUND

The modern network includes a combination of underlying and overlaying networks that transit multiple value-add services. These networks and services span across multiple administrative domains, creating different vantage points for different types of security, privacy, and service-specific policies. These modern networks are becoming more complex, making it more difficult to observe and measure various metrics across an entire stack.

DESCRIPTION OF EXAMPLE EMBODIMENTS

Overview

Figure 1:
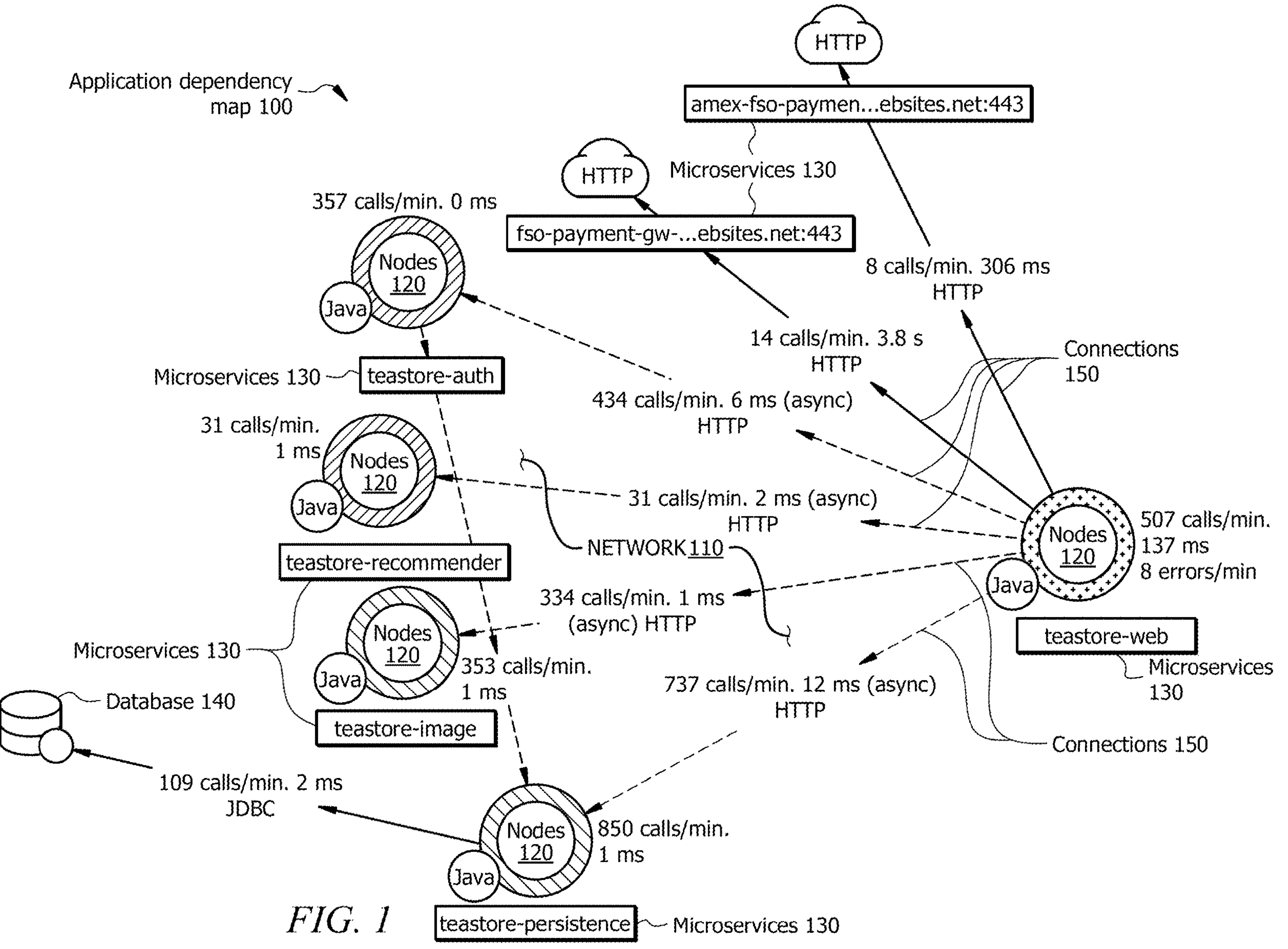
FIG. 1 illustrates an application dependency map, in accordance with certain embodiments.

According to an embodiment, a controller includes one or more processors and one or more computer-readable non-transitory storage media coupled to the one or more processors and including instructions that, when executed by the one or more processors, cause the controller to perform operations. The operations include generating a security policy and converting the security policy into a chaos hypothesis. The operations also include initiating execution of the chaos hypothesis across a plurality of microservices within a technology stack. The operations further include receiving metrics associated with the execution of the chaos hypothesis across the plurality of microservices within the technology stack.

In certain embodiments, the operations include communicating the chaos hypothesis to a plurality of full-stack observability (FSO) agents associated with the plurality of microservices. In some embodiments, the FSO agents include one or more of the following types of FSO agents: endpoint agents, enterprise agents, end user monitoring (EUM) agents, and real user monitoring (RUM) agents.

In certain embodiments, initiating execution of chaos hypothesis across the plurality of microservices within the technology stack includes communicating the chaos hypothesis to an endpoint agent with instructions to execute the chaos hypothesis across the plurality of microservices within the technology stack. In some embodiments, receiving the metrics associated with the execution of the chaos hypothesis across the plurality of microservices within the technology stack includes receiving the metrics from the endpoint agent.

In certain embodiments, the chaos hypothesis includes a type, a name, a steady state, a hypothesis, one or more execution actions, one or more execution metrics, and execution logic. In some embodiments, the operations include dynamically deriving different types of chaos hypotheses for observability and policy compliance.

In certain embodiments, the security policy is associated with one of the following actions: denying a group of users access to an application; denying site users access to a cloud application; denying a transaction from a user to the application; or denying a group of users access to the application during business hours.

According to another embodiment, a method includes generating a security policy and converting the security policy into a chaos hypothesis. The method also includes initiating execution of the chaos hypothesis across a plurality of microservices within a technology stack. The method further includes receiving metrics associated with the execution of the chaos hypothesis across the plurality of microservices within the technology stack.

According to yet another embodiment, one or more computer-readable non-transitory storage media embody instructions that, when executed by a processor, cause the processor to perform operations. The operations include generating a security policy and converting the security policy into a chaos hypothesis. The operations also include initiating execution of the chaos hypothesis across a plurality of microservices within a technology stack. The operations further include receiving metrics associated with the execution of the chaos hypothesis across the plurality of microservices within the technology stack.

The combination of underlying and overlaying networks that transit multiple value-add services spanning across multiple administrative domains are becoming more complex. For example, a remote user may be connected through a third party and/or a shared access network where minimal policies are applied on the end-user machine itself (or on the access network) to classify the traffic at a broad level and/or steer software as a service (SaaS) traffic directly to the respective SaaS cloud, steer private applications to the associated private cloud, and steer the remaining traffic to the corporate data center. The SaaS cloud, private cloud, and the data center edge may have additional corporate-specific policies to filter/inspect the traffic for further analytics and treatment. While different policies are applied at different vantage points, these policies may not be applied correctly or work as desired. For instance, policies applied to a software-defined access (SDA) fabric edge may not be applied as expected, causing traffic to be steered as if there is no policy applied for the traffic.

Observing and measuring various metrics across an entire stack may assist in optimizing the performance of the network and the user experience. Different types of agents may be available for each network component. Each type of agent has its own specific capabilities such that all of the different types of agents together can perform the above-mentioned job of observing and measuring network metrics. These agents are currently used specifically from the performance observability point of view.

Chaos Engineering is a new discipline of experimenting with various hypotheses and/or failures to gather more information about a system to improve its resiliency and confidence. This discipline introduces the act of injecting and/or simulating failures in a controlled manner with minimal or no impact to the production environment. Most (if not all) of the current chaos tools (e.g., Chaos monkey, Chaos Kong, Gremlin, etc.) primarily focus on a specific domain. The failure is injected into an application and the data is collected from within the same domain, making these tools domain-specific with limited/narrow scope. For example, Netflix and other enterprises use chaos tools to inject different types of failures into the application by killing the containers hosting the application and recording the action. The current nature of chaos engineering applied for the application may impact the end-user, depending on the type of failure being injected.

Currently, application performance management (APM) agents use synthetic probes to measure different metrics. However, these APM agents currently are not used for chaos testing or compliance validation using negative testing. Security and/or policy compliances are currently validated using manual testing. For example, the operations team may create different test cases and execute the test cases from the user machine. This disclosure leverages the chaos principle and full-stack observability (FSO) components to execute the same types of test cases in a dynamic manner. In certain embodiments, the chaos controller is used to derive different types of hypotheses for observability and/or policy compliance validation. Based on the security and other types of policies, different user, site, and application specific hypotheses are created. These hypotheses are programmed on the relevant FSO agents to execute the compliance validation and collect relevant metrics and logs. Any deviations are observed such that relevant actions can be executed.

Technical advantages of certain embodiments of this disclosure may include one or more of the following. Certain embodiments of this disclosure apply chaos engineering to cloud and native infrastructures. In certain embodiments, a chaos controller is leveraged to apply different user, site, and application specific (dynamically/manually defined) hypotheses derived based on the policies. In some embodiments, agents (e.g., FSO agents) are leveraged and extended to apply these chaos hypotheses for policy compliance and/or assurance. Certain embodiments of this disclosure leverage FSO components to inject different types of transaction-specific failures. In certain embodiments described herein, a combination of instrumentation code and agents is used to measure the behavior of just failures with minimal or no impact on the end customers.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

Figure 2:
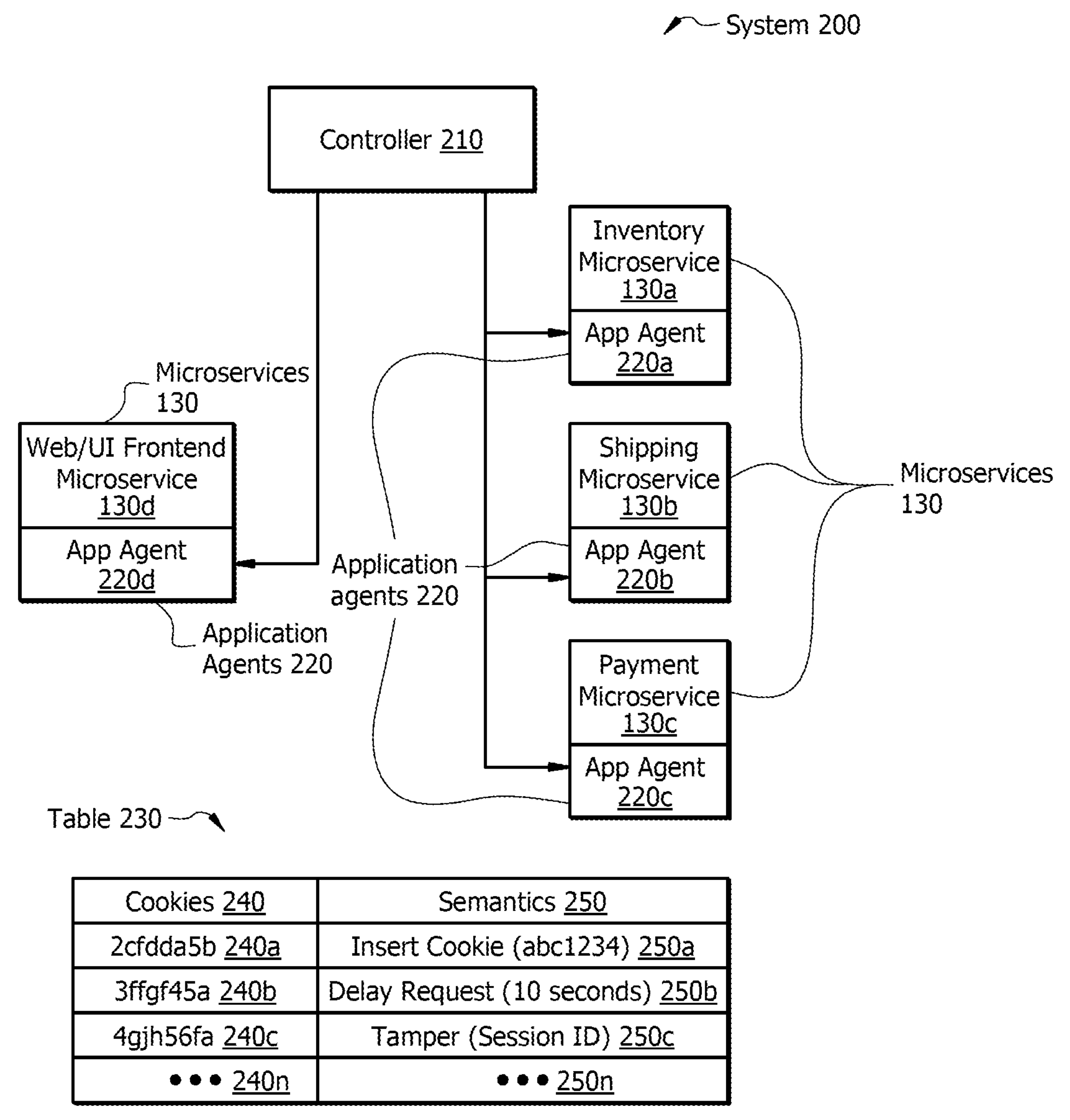
FIG. 2 illustrates a system for augmenting additional instructions to application agents within an application stack, in accordance with certain embodiments.
Figure 3:
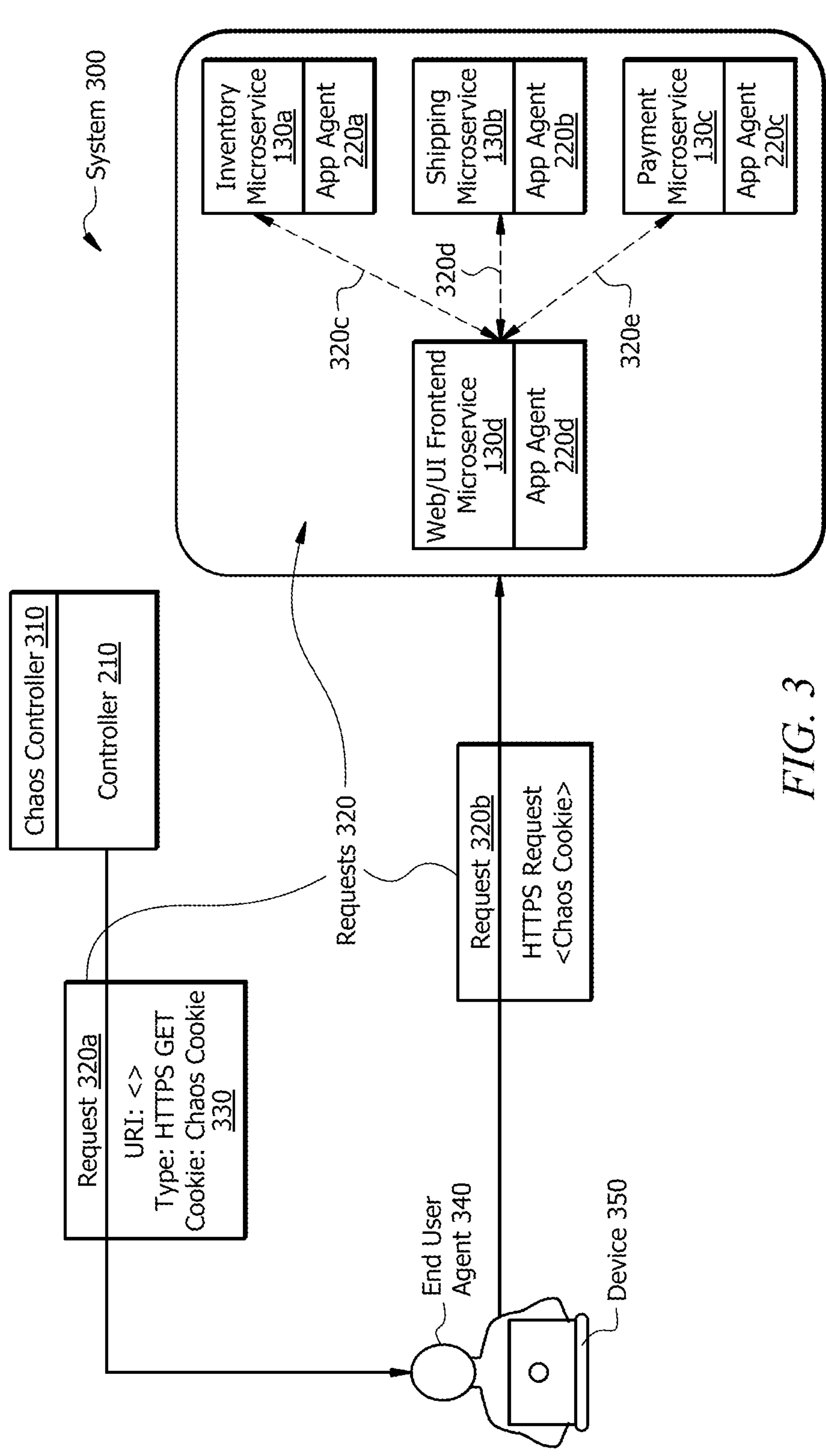
FIG. 3 illustrates a system for injecting failures into an application stack, in accordance with certain embodiments.
Figure 4:
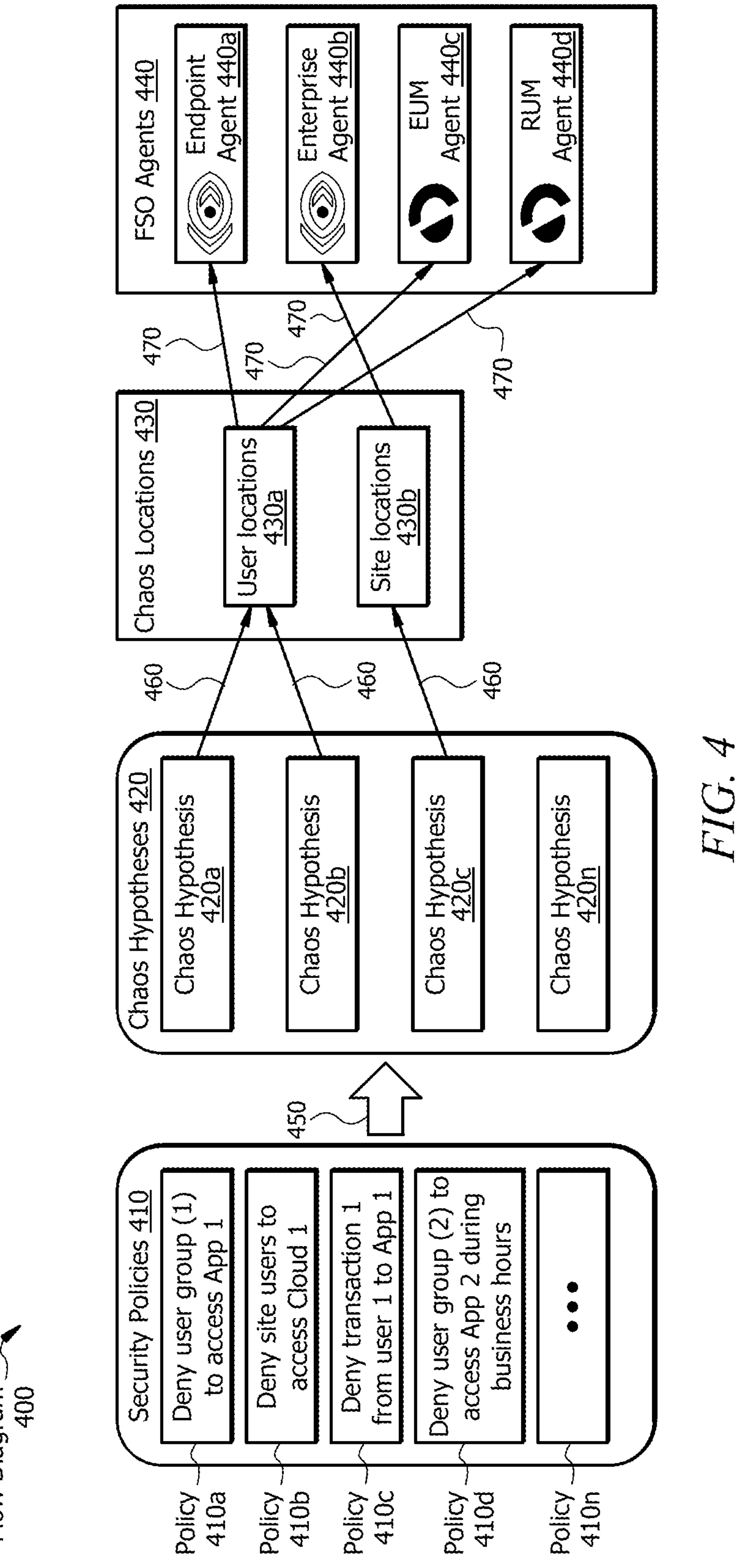
FIG. 4 illustrates a flow diagram for deriving chaos hypotheses, in accordance with certain embodiments.
Figure 5:
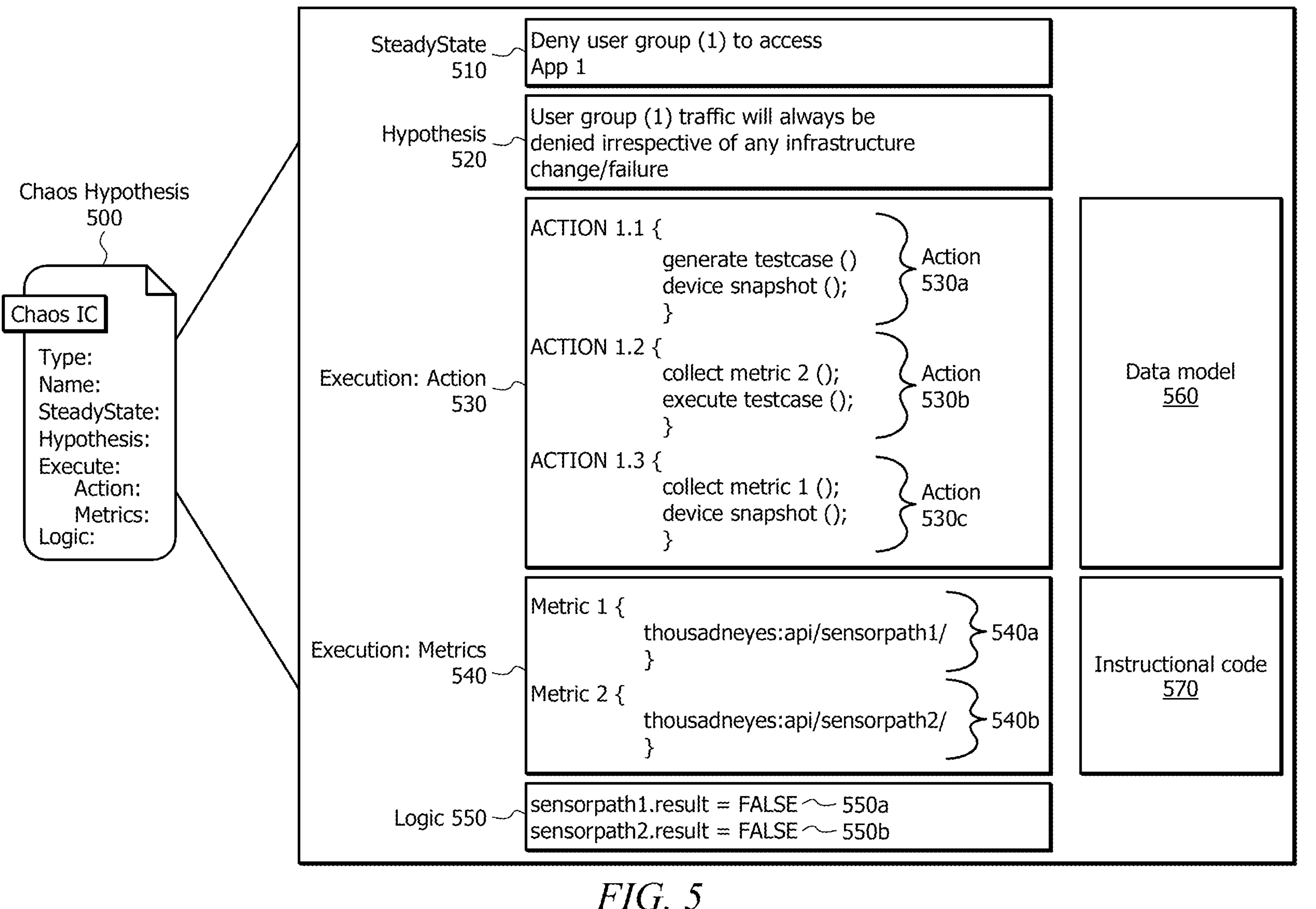
FIG. 5 illustrates a chaos hypothesis, in accordance with certain embodiments.
Figure 6:
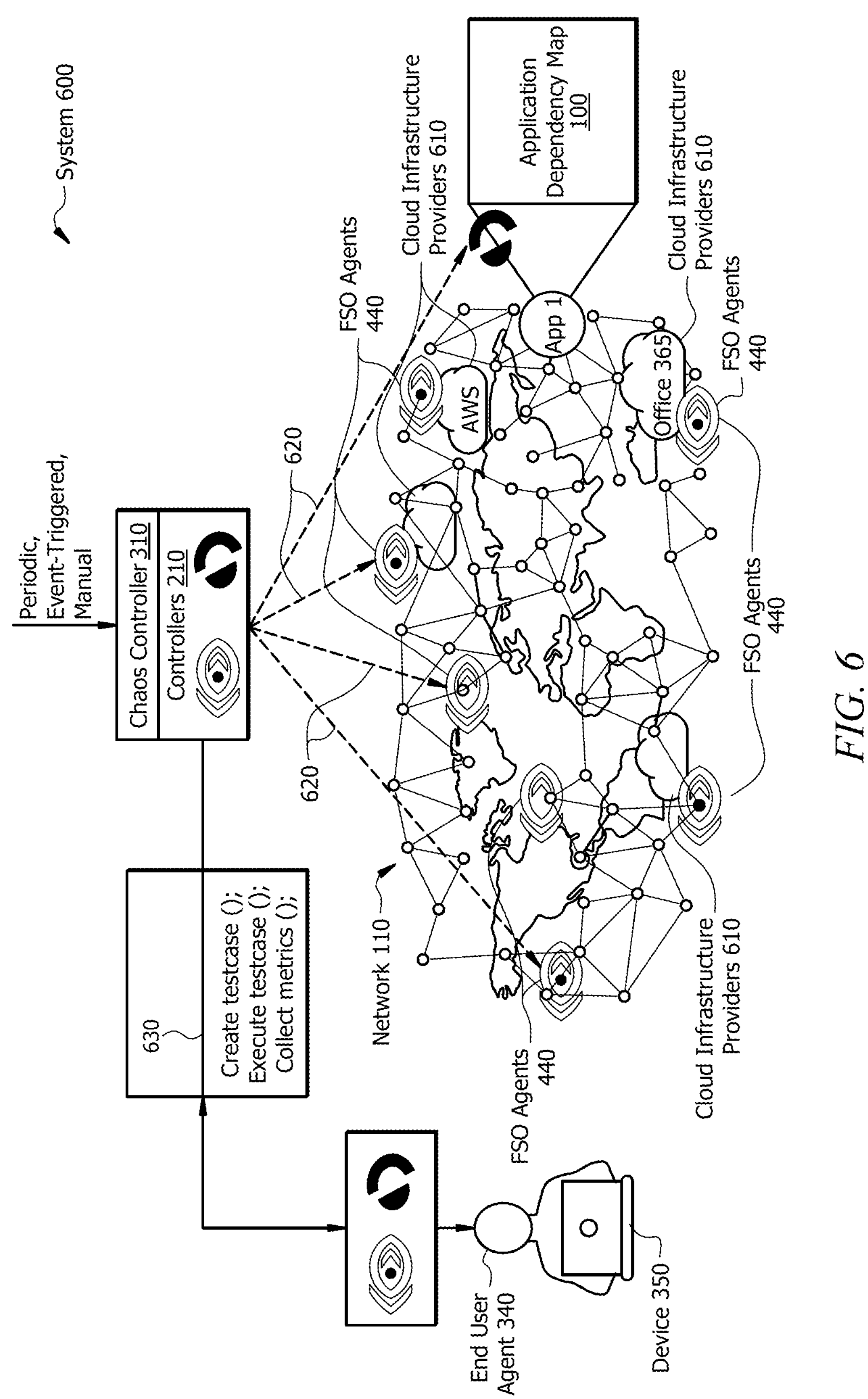
FIG. 6 illustrates a system for injecting failures across a technology stack, in accordance with certain embodiments.
Figure 7:
FIG. 7 illustrates a method for injecting failures across a technology stack, in accordance with certain embodiments.
Figure 7:
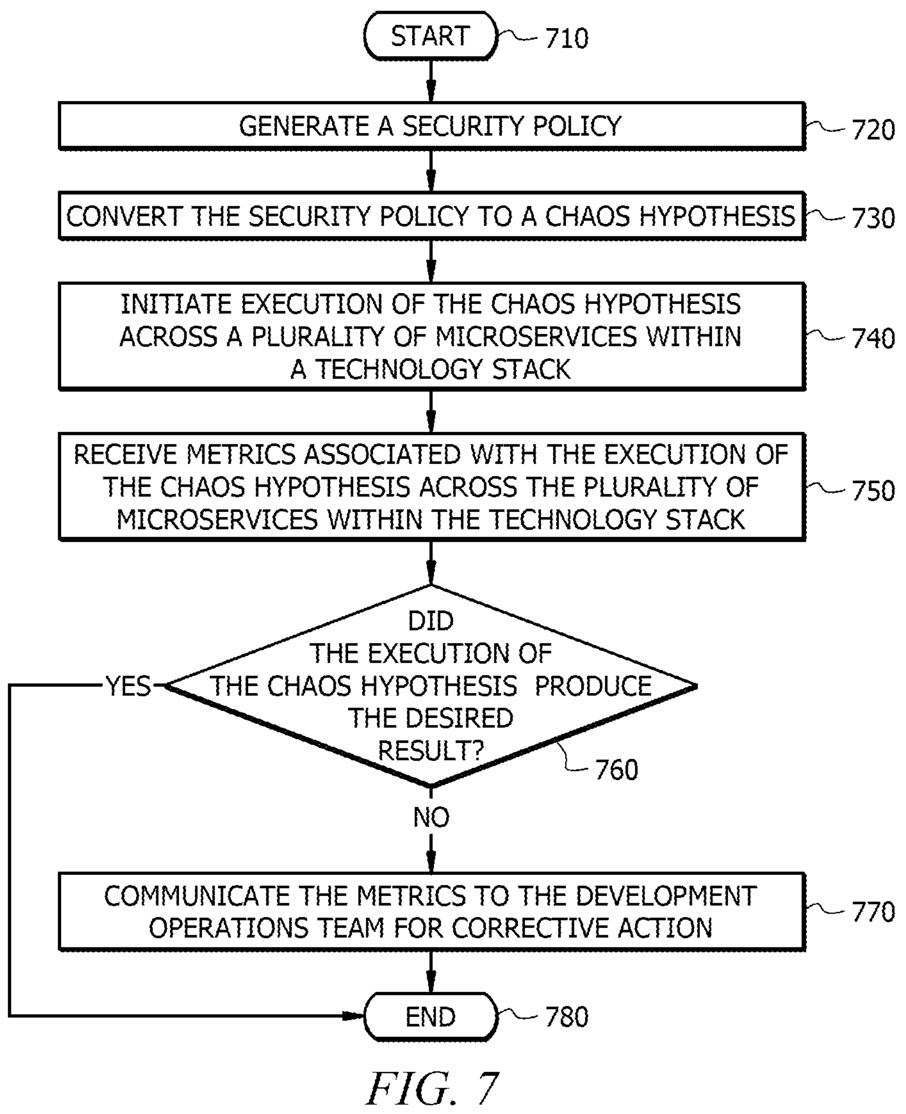
Figure 8:
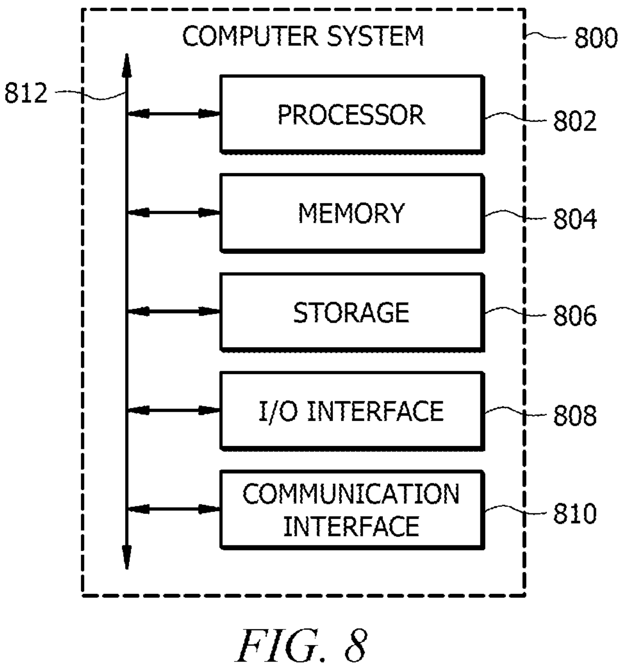
FIG. 8 illustrates a computer system that may be used by the systems and methods described herein, in accordance with certain embodiments.

This disclosure describes systems and methods for sending failure injections for injecting failures across a stack. FIG. 1 illustrates an example application dependency map that may be used by the systems of FIGS. 2, 3, and 6. FIG. 2 shows an example system for augmenting additional instructions to application agents within an application stack, and FIG. 3 illustrates an example system for injecting failures into an application stack. FIG. 4 shows an example flow diagram for deriving chaos hypotheses, and FIG. 5 illustrates an example chaos hypothesis that may be used by the flow diagram of FIG. 4. FIG. 6 shows an example system for injecting failures across a technology stack, and FIG. 7 illustrates an example method for injecting failures across a technology stack. FIG. 8 shows a computer system that may be used by the systems and methods described herein.

FIG. 1 illustrates an application dependency map 100. Application dependency map 100 of FIG. 1 includes a network 110, nodes 120, microservices 130, a database 140, and connections 150. Network 110 of application dependency map 100 is any type of network that facilitates communication between components of application dependency map 100. Network 110 may connect one or more components of application dependency map 100. One or more portions of network 110 may include an ad-hoc network, the Internet, an intranet, an extranet, a virtual private network (VPN), an Ethernet VPN (EVPN), a local area network (LAN), a wireless LAN (WLAN), a virtual LAN (VLAN), a wide area network (WAN), a wireless WAN (WWAN), a software-defined WAN (SD-WAN), a metropolitan area network (MAN), a portion of the Public Switched Telephone Network (PSTN), a cellular telephone network, a Digital Subscriber Line (DSL), an Multiprotocol Label Switching (MPLS) network, a 3G/4G/5G network, a Long Term Evolution (LTE) network, a cloud network, a combination of two or more of these, or other suitable types of networks. Network 110 may include one or more different types of networks. Network 110 may be any communications network, such as a private network, a public network, a connection through the Internet, a mobile network, a Wi-Fi network, etc. Network 110 may include a core network, an access network of a service provider, an Internet service provider (ISP) network, and the like. One or more components of application dependency map 100 may communicate over network 110.

Nodes 120 of application dependency map 100 are connection points within network 110 that receive, create, store and/or send data along a path. Nodes 120 may include one or more redistribution points that recognize, process, and forward data to other nodes of network 110. Nodes 120 may include virtual and/or physical nodes. For example, nodes 120 may include one or more physical devices, virtual machines, bare metal servers, and the like. As another example, nodes 120 may include data communications equipment such as computers, routers, servers, printers, devices, workstations, switches, bridges, modems, hubs, and the like.

Microservices 130 are loosely coupled application services. In certain embodiments, each microservice 130 is independently built and/or maintained. When working together, microservices 130 collectively form an application. Microservices 130 may be organized to align individually to business functions (e.g., payments, messaging services, a service for processing shipping orders, user account management services, etc.). Microservices 130 may be written in Java, JavaScript, Python, Structured Query Language (SQL), Node.js, Go, any other suitable programming language, or a combination thereof.

Database 140 of application dependency map 100 is a database for microservices 130. In certain embodiments, database 140 is a relational database such as an SQL server, DB2, Microsoft (MS) SQL Server, MySQL, PostgreSQL, and the like. In some embodiments, each microservice 130 has database credentials that only grant it access to its own (logical) database on database 140 (e.g., a shared MySQL server).

In certain embodiments, the distributed microservice application is developed with microservices 130 on a hybrid infrastructure. For example, database 140 may be deployed in a private data center, whereas the frontend and the remaining microservices 130 may be deployed in a public cloud. In certain embodiments, the payment gateways are external such that the connections are made via the Internet. In the illustrated embodiment of FIG. 1, microservices 130 include a Web user interface (UI) microservice (teastore-webui), an authorization microservice (teastore-auth), an image microservice (teastore-image), a recommender microservice (teastore-recommender), a persistence microservice (teastore-persistence), and payment gateways (amex-fso-payment . . . websites.net: 443 and fso-payment-gw . . . websites.net: 443). In certain embodiments, Web UI microservice 130 is associated with a client, and remaining microservices 130 are associated with servers. In the illustrated embodiment of FIG. 1, microservices 130 communicate with each other using Hypertext Transfer Protocol (HTTP) calls.

Connections 150 of application dependency map 100 represent communication links between microservices 130. Each connection 150 includes a number of calls (e.g., HTTP calls) per minute and the associated latency (e.g., average latency). For example, connection 150 located between Web UI microservice 130 and recommender microservice 130 includes 31 calls per minute with a 2 millisecond (ms) latency. As another example, connection 150 located between Web UI microservice 130 and image microservice 130 includes 334 calls per minute with a 1 ms latency. As still another example, connection 150 located between Web UI microservice 130 and AMEX FSO payment microservice 130 includes 8 calls per minute with a 306 ms latency.

In certain embodiments, different types of failures are injected into the distributed microservice application to measure the behavior of the client and/or the server modules. For example, a failure (e.g., a delay) may be injected into a payment microservice 130 to observe how the client and/or other dependent modules are behaving. However, injecting such failures in current applications is very complex and may negatively impact the actual users.

Although FIG. 1 illustrates a particular number of application dependency maps 100, networks 110, nodes 120, microservices 130, databases 140, and connections 150, this disclosure contemplates any suitable number of application dependency maps 100, networks 110, nodes 120, microservices 130, databases 140, and connections 150. Although FIG. 1 illustrates a particular arrangement of nodes 120, microservices 130, database 140, and connections 150 within application dependency map 100, this disclosure contemplates any suitable arrangement of nodes 120, microservices 130, database 140, and connections 150 within application dependency map 100. Although FIG. 1 illustrates describes and illustrates particular components, devices, or systems carrying out particular actions, this disclosure contemplates any suitable combination of any suitable components, devices, or systems carrying out any suitable actions.

FIG. 2 illustrates a system 200 for augmenting additional instructions to application agents 220 within an application stack, in accordance with certain embodiments. System 200 or portions thereof may be associated with an entity, which may include any entity, such as a business, company, or enterprise, that injects failures into application stacks. An application stack includes software components required to run an application. In certain embodiments, the software components may be virtualization or abstracted physical hardware resources. The components of system 200 may include any combination of hardware, firmware, and software. For example, the components of system 200 may use one or more elements of the computer system of FIG. 8. System 200 includes a controller 210, application agents 220, microservices 130, a table 230, cookies 240, and semantics 250.

Controller 210 of system 200 represents a central management server that stores and/or analyzes data. In certain embodiments, controller 210 receives metrics from application agents 220 and/or communicates instructions to application agents 220. Controller 210 may display performance activity via a Web UI, which allows the user to view data insights from multiple microservices 130 in one place. In some embodiments, controller 210 is updated in real-time to assist the user with monitoring, troubleshooting, and/or analyzing the application stack from the backend infrastructure to the end user via one interface. In certain embodiments, controller 210 is a software-defined networking (SDN) controller.

Microservices 130 of system 200 are generally described above in FIG. 1. Microservices 130 of FIG. 2 include an inventory microservice 130*a*, a shipping microservice 130*b*, a payment microservice 130*c*, and Web UI/frontend microservice 130*d*. Inventory microservice 130*a* may compute the status of a device by reading available stock, counting the number of reservations, etc. Shipping microservice 130*b* may provide shipping capabilities, manage deliveries, and the like. Payment microservice 130*c* may manage payment transactions, process payments, etc.

Web UI/frontend microservice 130*d* includes a Web UI. In certain embodiments, the Web UI is the primary interface used to monitor, troubleshoot, and/or analyze application stack, from backend infrastructure and servers to the application of the end user. In certain embodiments, Web UI is an HTML-based (e.g., HTML5-based) browser application that works with any modern browser (e.g., Safari, Chrome, Firefox, Microsoft Edge, Internet Explorer, etc.). Web UI may include a navigation bar, a navigation menu, a settings menu, a time range menu, and the like. In some embodiments, controller 210 provides Web UI/frontend microservice 130*d* for monitoring and/or troubleshooting application performance.

Application agents 220 of system 200 represent plug-ins and/or extensions that monitor the performance of the application code, runtime, and/or behavior. In certain embodiments, application agents 220 represent software that is installed on a server (or within an application) that sends performance data back to Controller 210. Application agents 220 may be deployed to every corner (e.g., devices, containers, hosts, applications, etc.) of the application environment. In certain embodiments, application agents 220 immediately monitor every line of code upon their deployment. In some embodiments, application agents 220 connect to controller 210 to report data. Application agents 220 may include cloud agents, enterprise agents, endpoint agents, EUM agents, RUM agents, and the like.

In the illustrated embodiment of FIG. 2, application agents 220 include application agent 220*a*, application agent 220*b*, application agent 220*c*, and application agent 220*d*. Application agent 220*a* is associated with inventory microservice 130*a*, application agent 220*b* is associated with shipping microservice 130*b*, application agent 220*c* is associated with payment microservice 130*c*, and application agent 220*d* is associated with Web UI/frontend microservice 130*d*. In some embodiments, application agents 220 communicate real-time performance data generated by their respective microservices 130 to controller 210. Controller 210 may then visualize application performance and communicate instructions to application agents 220. Controller 210 may be used to augment additional instructions to application agents 220 within the application stack. In certain embodiments, application agents 220 inject the additional instructions into the runtime process of microservices 130 using one or more rules. The rules are described in table 230 of FIG. 2.

Table 230 of system 200 represents an arrangement of information in rows and columns. Table 230 includes a column of cookies 240 and a column of semantics 250. Cookies 240 are pieces of information stored as text strings on a machine. In some embodiments, cookies 240 include metadata. Cookies 240 may be communicated between components of system 200. In certain embodiments, application agents 220 insert cookies 240 into the runtime process of microservices 130 using one or more rules. Cookies 240 of table 230 include cookie 240*a* (2cfdda5b), cookie 240*b* (3ffgf45a), cookie 240*c* (4gjh56fa), and so on to cookie 240*n*, where n represents any suitable integer.

Semantics 250 of table 230 are rules that match cookies 240 to one or more actions. In certain embodiments, semantics 250 instruct one or more components of system 200 on how to interpret cookies 240. Semantics 250 include semantic 250*a*, semantic 250*b*, semantic 250*c*, and so on. Semantic 250*a* instructs system 200 to insert cookie 240 (e.g., abc 1234) into a server request. Semantic 250*b* instructs system 200 to delay the communication of a server request for 10 seconds. Semantic 250*c* instructs system 200 to tamper a session between the frontend and the backend. Other actions associated with semantics 250 may include truncating the output, stopping a loop at a first error, etc.

By leveraging the custom transaction rule capability of controller 210, different rules may be created to match specific cookie values and/or other metadata to trigger different actions. For example, application agent 220*d* for Web UI/frontend microservice 130*d* may be instructed to match cookie 240*b* to semantic 250*b*, which delays requests for predetermined amount of time (e.g., 10 seconds). As another example, application agent 220*d* for Web UI/frontend microservice 130*d* may be instructed to match cookie 240*a* to semantic 250*a*, which inserts an additional cookie or metadata into the request, which may in turn instruct different semantics 250 on other applications within the technology stack. The actions may include delaying one or more transactions to collect logs from the client(s) to observe how applications react when a specific service/request times out. In certain embodiments, cookies 240 are pre-programmed within application agents 220. In some embodiments, cookies 240 are dynamically programmed with different semantics 250 associated with cookies 240.

The same or different cookies 240 may be used across microservices 130 within the application stack. In certain embodiments, controller 210, upon being required to inject any specific failure as part of chaos engineering, identifies the relevant set of application agents 220 (e.g., EUM/RUM agents) and instructs the relevant type of request with the relevant type of cookie 240.

Although FIG. 2 illustrates a particular number of controllers 210, application agents 220, microservices 130, tables 230, cookies 240, and semantics 250, this disclosure contemplates any suitable number of controllers 210, application agents 220, microservices 130, tables 230, cookies 240, and semantics 250. Although FIG. 2 illustrates a particular arrangement of controller 210, application agents 220, microservices 130, table 230, cookies 240, and semantics 250, this disclosure contemplates any suitable arrangement of controller 210, application agents 220, microservices 130, table 230, cookies 240, and semantics 250. Although FIG. 2 illustrates describes and illustrates particular components, devices, or systems carrying out particular actions, this disclosure contemplates any suitable combination of any suitable components, devices, or systems carrying out any suitable actions.

FIG. 3 illustrates a system 300 for injecting failures into an application stack, in accordance with certain embodiments. System 300 includes a chaos controller 310, controller 210, requests 320, a chaos cookie 330, an end user agent 340, a device 350, microservices 130, and application agents 220. Microservices 130, controller 210, and application agents 220 are described above in FIGS. 1 and 2.

Chaos controller 310 represents a controller augmented with chaos testing capabilities. Chaos testing capabilities may include injecting failures as part of chaos engineering, identifying the relevant set of application agents 220, instructing the relevant types of requests 320 with the relevant types of cookies 240, etc.

Requests 320 represent communications from one component to another component of system 300. Each request 320 may include the type of request 320 (e.g., an HTTPS GET request), a Uniform Resource Identifier (URI), and chaos cookie 330. Requests 320 of system 300 include request 320*a*, request 320*b*, request 320*c*, request 320*d*, and request 320*e*. Request 320*a* is communicated from chaos controller 310 to end user agent 340. Request 320*b* is communicated from end user agent 340 to application agent 220*d* associated with Web UI/frontend microservice 130*d*. Request 320*c* is communicated from Web UI/frontend microservice 130*d* to application agent 220*a* associated with inventory microservice 130*a*. Request 320*d* communicated from Web UI/frontend microservice 130*d* to application agent 220*b* associated with shipping microservice 130*b*. Request 320*e* is communicated from Web UI/frontend microservice 130*d* to application agent 220*c* associated with payment microservice 130*c*.

Chaos cookie 330 represents instrumentation code augmented with chaos testing capabilities. In certain embodiments, application agents 220 are used to inject chaos cookies 330 within the application stack. Different application agents 220 may be leveraged to measure and/or collect different metrics for end-to-end performance measurement. In certain embodiments, metadata/cookie specific instructions and/or the associated semantics are dynamically programmed within the instrumentation code of chaos cookie 330. These instructions may include random data entry (e.g., including null values in mandatory fields), potentially unexpected types of data entry (e.g., entering a string of letters for a field that is expecting numerical values), etc. To prevent data corruption, all chaos cookie instructions may be tagged to separate these entries and/or events from legitimate user transactions. In certain embodiments, chaos controller 310 instructs end user agent 340 with the details of request 320*a* including chaos cookie 330 to trigger different types of failures within the application stack (or the client). One or more chaos cookies 330 may be included to inject multiple types of failures.

End user agent 340 represents software that retrieves and presents Web content for end users and/or is implemented using Web technologies. In certain embodiments, end user agent 340 collects performance data directly from device 350. In some embodiments, end user agent 340 provides direct insight into how an application is performing from the perspective of the end user. Device 350 represents any piece of computing hardware. Device 350 may include a laptop, tablet, hot spot, mobile phone, personal computer, and the like. In certain embodiments, end user agent 340 is installed on device 350.

In certain embodiments, application agent 220*d* associated with Web UI/frontend microservice 130*d* communicates request 320*a* to application agent 220*a* associated with inventory microservice 130*a*, communicates request 320*a* to application agent 220*b* associated with shipping microservice 130*b*, and communicates request 320*a* to application agent 220*c* associated with payment microservice 130*c*. Upon receiving requests 320, application agents 220 inject the failure instructed by chaos cookie 330. For example, application agent 220*a* may inject the failure associated with chaos cookie 330 into inventory microservice 130*a*, application agent 220*b* may inject the failure associated with chaos cookie 330 into shipping microservice 130*b*, and application agent 220*c* may inject the failure associated with chaos cookie 330 into payment microservice 130*c*.

The failure associated with chaos cookie 330 may in turn be synthetic or real. For example, Web UI/frontend microservice 130*d* may have a rule to match chaos cookie 330 to tamper a session based on the session identifier and/or to include additional metadata that should not be seen from a specific user, site, etc. and measure the behavior of the backend and/or middleware service. This example represents a real failure. As another example, Web UI/frontend microservice 130*d* may include chaos cookie 330 that will be used by the backend to match and execute a delay. This example represents a synthetic failure. As these are synthetic probes/requests generated from application agents 220, multiple application agents 220 may be used with the same chaos cookie 330 to trigger load-specific failures in certain embodiments.

In some embodiments, EUM/RUM agents are used to trigger different types of synthetic transactions with chaos cookie 330 to differentiate the transaction to inject the failure. The instrumentation code leverages chaos cookie 330 to classify the transaction and execute the relevant failures for measurement. The metrics and/or the behavior details are collected from both the client and the server.

Although FIG. 3 illustrates a particular number of controllers 210, chaos controllers 310, application agents 220, microservices 130, requests 320, chaos cookies 330, end user agents 340, and devices 350, this disclosure contemplates any suitable number of controllers 210, chaos controllers 310, application agents 220, microservices 130, requests 320, chaos cookies 330, end user agents 340, and devices 350. For example, system 300 may include more or less than four application agents 220.

Although FIG. 3 illustrates a particular arrangement of controller 210, chaos controller 310, application agents 220, microservices 130, requests 320, chaos cookies 330, end user agent 340, and devices 350, this disclosure contemplates any suitable arrangement of controller 210, chaos controller 310, application agents 220, microservices 130, requests 320, chaos cookies 330, end user agent 340, and devices 350. For example, the functionalities of controller 210 and chaos controller 310 may be combined into one controller.

Although FIG. 3 illustrates describes and illustrates particular components, devices, or systems carrying out particular actions, this disclosure contemplates any suitable combination of any suitable components, devices, or systems carrying out any suitable actions.

FIG. 4 illustrates a flow diagram 400 for deriving chaos hypotheses 420, in accordance with certain embodiments. Flow diagram 400 of FIG. 4 includes security policies 410, chaos hypotheses 420, chaos locations 430, and FSO agents 440.

Security policies 410 represent rules that govern network behaviors. In certain embodiments, security policies 410 govern the connections between different network components. In the illustrated embodiment of FIG. 4, security policies 410 include security policy 410*a*, security policy 410*b*, security policy 410*c*, security policy 410*d*, and so on to security policy 410*n*, where n represents any suitable integer. Security policy 410*a* denies a particular user group (user group 1) access to a particular application (application 1). Security policy 410*b* denies users associated with a particular site access to a particular cloud (cloud 1). Security policy 410*c* denies a transaction from a particular user (user 1) to a particular application (application 1). Security policy 410*d* denies a particular use group (user group 2) access to a particular application (application 2) during business hours.

Chaos hypotheses 420 represent testable statements based on chaos engineering that can be proved or disproved as a result of testing. Chaos hypotheses 420 include chaos hypothesis 420*a*, chaos hypothesis 420*b*, chaos hypothesis 420*c*, chaos hypothesis 420*d*, and so on to chaos hypothesis 420*n*, where n represents any suitable integer. In certain embodiments, chaos hypotheses 420 are derived from security policies 410. For example, chaos hypothesis 420*a* may be derived from security policy 410*a*, chaos hypothesis 420*b* may be derived from security policy 410*b*, chaos hypothesis 420*c* may be derived from security policy 410*c*, and so on.

Chaos locations 430 represent the environments where chaos hypotheses 420 are executed. In certain embodiments, the controller may define chaos locations 430. In the illustrated embodiment of FIG. 4, chaos locations 430 include user location 430*a* and site location 430*b*. User location 430*a* represents the geographic location of the user. In certain embodiments, user locations 430*a* may be based on the Internet Protocol (IP) address reported in a request (e.g., request 320 of FIG. 3). Site location 430*b* represents the geographic locations of a site (e.g., headquarters, branch offices/stores, remote sites, data centers, etc.).

FSO agents 440 represent plug-ins or extensions that monitor the performance of application code, runtime, and/or behavior in an FSO environment. In the illustrated embodiment of FIG. 4, FSO agents 440 include an endpoint agent 440*a*, an enterprise agent 440*b*, an EUM agent 440*c*, and a RUM agent 440*d*. Endpoint agent 440*a* represents lightweight, software-based agent installed on end-user devices (e.g., laptops, desktops, etc.) to monitor end user experience. Enterprise agent 440*b* represents a lightweight, software-based agent that tests targets from inside a network or from infrastructure. Enterprise agent 440*b* may be installed on a network, in data centers, in branch offices, in virtual private clouds (VPCs), and the like. EUM agent 440*c* represents a software agent installed on end-user devices that collects and reports data. RUM agent 440*d* represents a software agent that provides performance metrics and error tracking of web applications. In certain embodiments, chaos hypothesis 420*a* is executed from endpoint agent 440*a* running on an end user device. In some embodiments, chaos hypotheses 420 is executed from any server within the site that is steering the traffic over the access network where security policies 410 are applied.

Flow diagram 400 of FIG. 4 includes steps 450 through 470. At step 450 of flow diagram 400, a chaos controller (e.g., chaos controller 310 of FIG. 3) consumes security policies 410 (e.g., user, site, and/or application specific policies) and derives different chaos hypotheses 420. In certain embodiments, the chaos controller may also consume more granular details such as the types of chaos hypotheses 420, the times to execute chaos hypotheses 420, etc. In the illustrated embodiment of FIG. 4, security policy 410*a* may be used to derive chaos hypothesis 420*a*, security policy 410*b* may be used to derive chaos hypothesis 420*b*, security policy 410*c* may be used to derive chaos hypothesis 420*c*, and so on. In certain embodiments, chaos hypotheses 420 are derived in a way to create test cases to generate synthetic probes with the sources matching the users and the destinations matching the applications, along with the respective transport layer details to bring it as in-band as possible to the actual traffic.

At step 460 of flow diagram 400, the chaos controller determines chaos locations 430 for executing chaos hypotheses 420. In the illustrated embodiment of FIG. 4, chaos hypothesis 420*a* and chaos hypothesis 420*b* are executed in user location 430*a*, and chaos hypothesis 420*c* is executed in site location 430*b*.

At step 470 of flow diagram 400, the chaos controller determines which FSO agents 440 will execute chaos hypotheses 420. Different security policies 410 may result in different types of chaos hypotheses 420 that need to be executed at different layers by different types of FSO agents 440. In the illustrated embodiment of FIG. 4, chaos hypothesis 420*a* and chaos hypothesis 420*b* associated with user location 430*a* are executed by EUM agent 440*c* and RUM agent 440*d*, and chaos hypothesis 420*c* associated with site location 430*b*500 is executed by endpoint agent 440.

Although this disclosure describes and illustrates particular steps of flow diagram 400 of FIG. 4 as occurring in a particular order, this disclosure contemplates any suitable steps of flow diagram 400 of FIG. 4 occurring in any suitable order. Although this disclosure describes and illustrates an example flow diagram for deriving chaos hypotheses, including the particular steps of the flow diagram of FIG. 4, this disclosure contemplates any suitable flow diagram for deriving chaos hypotheses, including any suitable steps, which may include all, some, or none of the steps of the flow diagram of FIG. 4, where appropriate. Although FIG. 4 describes and illustrates particular components, devices, or systems carrying out particular actions, this disclosure contemplates any suitable combination of any suitable components, devices, or systems carrying out any suitable actions.

FIG. 5 illustrates a chaos hypothesis 500, in accordance with certain embodiments. In certain embodiments, chaos hypothesis 500 corresponds to chaos hypothesis 420*a* of FIG. 4. Chaos hypothesis 500 includes a steady state 510, a hypothesis 520, actions 530, metrics 540, and logic 550.

Steady state 510 of chaos hypothesis 500 defines the measurable output that indicates normal behavior of the application. In the illustrated embodiment of FIG. 5, steady state 510 is represented by a security policy (e.g., security policy 410*a* of FIG. 4). The security policy denies a user group (user group 1) access to an application (application 1).

Hypothesis 520 of chaos hypothesis 500 indicates that the steady state will continue in the control group or the experimental group. In certain embodiments, steady state 510 is used to derive hypothesis 520. In the illustrated embodiment of FIG. 5, hypothesis 520 represents user group 1 traffic will always be denied irrespective of any infrastructure change and/or failure. In some embodiments, hypothesis 520 is derived in a way that it will create a test case to generate a synthetic probe with source matching the user and the destination matching the application along with the respective transport layer details to bring it as in-band as possible to the actual traffic.

Actions 530 of chaos hypothesis 500 are defined to execute the test case and/or collect relevant metrics used to validate chaos hypothesis 500. Actions 530 include action 530*a*, action 530*b*, and action 530*c*. Action 530*a* generates the test case using hypothesis 520 and takes a snapshot of the device. Action 530*b* collects metrics and executes the test case. Action 530*c* collects metrics and takes a snapshot of the device. In certain embodiments, the test case is executed from the end user agent (e.g., end user agent 340 of FIG. 3) running on the device (e.g., device 350 of FIG. 3). In some embodiments, the test case is executed from any server within the site that is steering the traffic over the access network where the security policy is applied.

Metrics 540 of chaos hypothesis 500 are used to validate hypothesis 520. In certain embodiments, metrics 540 are collected from the FSO agents (e.g., FSO agents 440 of FIG. 4). In the illustrated embodiment of FIG. 5, metrics 540 represent sensor paths. Each sensor path describes a YANG path or a subset of data definitions in a YANG data model within a container. In a YANG model, the sensor path may be specified to end at any level in the container hierarchy. Metric 540*a* represents a first sensor path, and metric 540*b* represents a second sensor path.

Logic 550 of chaos hypothesis 500 represents the diagnostic test results of the test case. Logic 550*a* indicates that the agent is not able to send the packet to the application via the first sensor path (sensorpath1.result=FALSE), which is the desired result. Logic 550*b* indicates that the agent is not able to send the packet to the application (sensorpath2.result=FALSE) via the second sensor path, which is the desired result.

Data model 560 illustrates how the structured data may be displayed on the console. In certain embodiments, data model 560 has a structured hierarchy that includes a module and a leaf. The module may include the interfaces, and the leaf may include the name, the description, the type, an enable feature, a link up or down trap enable feature, an administrative status, an operational status, a last change feature, an if index feature, and the like.

In certain embodiments, instructional code 570 is used to collect metrics 540. Instructional code 570 may include a curl request, a test name, an interval, agents, a content type, an accept indication, etc. The test name may provide a human-readable label for the test case. The interval may indicate how frequently the test case will be run. The agents may be used to identify the agents to be assigned to the test case. The content type may specify the type of data (e.g., JSON). The accept indication may indicate whether the server can accept the specified type of data.

Although FIG. 5 illustrates a particular number of chaos hypotheses 500, steady states 510, hypotheses 520, actions 530, metrics 540, logic 550, data models 560, and instructional code 570, this disclosure contemplates any suitable number of chaos hypotheses 500, steady states 510, hypotheses 520, actions 530, metrics 540, logic 550, data models 560, and instructional code 570. Although FIG. 5 illustrates a particular arrangement of chaos hypothesis 500, steady state 510, hypothesis 520, actions 530, metrics 540, logic 550, data model 560, and instructional code 570, this disclosure contemplates any suitable arrangement of chaos hypothesis 500, steady state 510, hypothesis 520, actions 530, metrics 540, logic 550, data models 560, and instructional code 570. Although FIG. 5 illustrates describes and illustrates particular components, devices, or systems carrying out particular actions, this disclosure contemplates any suitable combination of any suitable components, devices, or systems carrying out any suitable actions.

FIG. 6 illustrates a system 600 for injecting failures across a technology stack, in accordance with certain embodiments. The technology stack includes both software hand hardware components of system 600. System 600 includes network 110, controllers 210, chaos controller 310, end user agent 340, device 350, FSO agents 440, and cloud providers 610. Network 110, controllers 210, chaos controller 310, end user agent 340, device 350, and FSO agents 440 are described above in FIGS. 1 though 4. Cloud providers 610 represent entities that provide cloud services. In certain embodiments, one or more cloud providers 610 establish public clouds, manage private clouds, offer on-demand cloud computing services, and the like. Cloud computing services may include Infrastructure-as-a-Service (IaaS), Platform-as-a-Service (PaaS), SaaS, etc. In the illustrated embodiment of FIG. 6, cloud providers 610 include Amazon Web Services (AWS), Google, Office 365, and Workday.

In system 600 of FIG. 6, chaos controller 310 communicates with controllers 210 (e.g., FSO controllers) to push (see notation 620) test cases to FSO agents 440. FSO agents 440 execute the test cases based on the associated events. In certain embodiments, chaos controller 310 pushes the test cases to FSO agents 440 based on the security policies (e.g., security policies 410 of FIG. 4) that need to be validated.

A test case is created (see notation 630) to generate a synthetic packet that matches a particular user group (e.g., user group (1) of FIG. 5) to a particular application (App1) and to observe whether the traffic is passing through. End user agent 340 running on device 350 is used to execute this test case. Metrics (e.g., metrics 540 of FIG. 5) are collected from FSO agents 440. The logic (e.g., logic 550 of FIG. 5) associated with this chaos hypothesis (e.g., chaos hypothesis 500 of FIG. 5) indicates whether end user agent 340 is able to send the packet to the application.

Any transaction-specific policies can be applied using FSO agents 440 (e.g., the EUM/RUM agents) to check if the transactions go through or if the relevant error is popped back to the user. In certain embodiments, test cases are executed using any suitable combination of FSO agents 440 (e.g., endpoint agents, enterprise agents, EUM agents, and/or RUM agents). Test cases may be executed for any specific policy execution.

Although FIG. 6 illustrates a particular number of networks 110, controllers 210, chaos controllers 310, end user agents 340, devices 350, FSO agents 440, and cloud providers 610, this disclosure contemplates any suitable number of networks 110, controllers 210, chaos controllers 310, end user agents 340, devices 350, FSO agents 440, and cloud providers 610. Although FIG. 6 illustrates a particular arrangement of network 110, controller 210, chaos controller 310, end user agent 340, device 350, FSO agents 440, and cloud providers 610, this disclosure contemplates any suitable arrangement of network 110, controller 210, chaos controller 310, end user agent 340, device 350, FSO agents 440, and cloud providers 610. Although FIG. 6 illustrates describes and illustrates particular components, devices, or systems carrying out particular actions, this disclosure contemplates any suitable combination of any suitable components, devices, or systems carrying out any suitable actions.

FIG. 7 illustrates a method 700 for injecting failures across a technology stack, in accordance with certain embodiments. Method 700 starts at step 710. At step 720 of method 700, a controller generates a security policy. For example, referring to FIGS. 3 and 4, chaos controller 310 may generate security policies 410 such as user, site, and/or application specific policies to test network performance.

In certain embodiments, the security policy is associated with one of the following actions: denying a group of users access to an application; denying site users access to a cloud application; denying a transaction from a user to the application; or denying a group of users access to the application during business hours. Method 700 then moves from step 720 to step 730.

At step 730 of method 700, the controller converts the security policy into a chaos hypothesis. For example, referring to FIGS. 3 and 4 chaos controller 310 may derive chaos hypothesis 420*a* in a way to create a test case to generate synthetic probes with the sources matching the users and the destinations matching the applications, along with the respective transport layer details to bring it as in-band as possible to the actual traffic. In certain embodiments, the chaos hypothesis includes a type, a name, a steady state, a hypothesis, one or more execution actions, one or more execution metrics, and execution logic. In some embodiments, controller may dynamically derive different types of chaos hypotheses for observability and policy compliance. Method 700 then moves from step 730 to step 740.

At step 740 of method 700, the controller initiates execution of the chaos hypothesis across a plurality of microservices within a technology stack. For example, referring to FIG. 6, chaos controller 310 may communicate the chaos hypothesis to a plurality of FSO agents 440 associated with a plurality of microservices. In some embodiments, FSO agents 440 include one or more of the following types of agents: endpoint agents, enterprise agents, end user monitoring (EUM) agents, and real user monitoring (RUM) agents. The controller may then initiate execution of chaos hypothesis across the plurality of microservices within the technology stack by communicating the chaos hypothesis to an endpoint agent with instructions to execute the chaos hypothesis across the plurality of microservices within the technology stack. Method 700 then moves from step 740 to step 750.

At step 750 of method 700, the controller receives metrics associated with the execution of the chaos hypothesis across the plurality of microservices within the technology stack. In certain embodiments, the controller receives the metrics from the endpoint agent. Method 700 then moves from step 750 to step 760, where the controller determines whether the execution of the chaos hypothesis produced the desired result. If the controller determines that the chaos hypothesis produced the desired result, method 700 moves from step 760 to step 780, where method 700 ends. If, at step 760, the controller determines that the chaos hypothesis did not produce the desired result, method 700 moves from step 760 to step 770, where the controller communicates the metrics to the development operations team for corrective action. Method 700 then moves from step 770 to step 780, where method 700 ends.

Although this disclosure describes and illustrates particular steps of method 700 700 of FIG. 7 as occurring in a particular order, this disclosure contemplates any suitable steps of method 700 of FIG. 7 occurring in any suitable order. Although this disclosure describes and illustrates an example method for injecting failures across a technology stack, including the particular steps of the method of FIG. 7, this disclosure contemplates any suitable method for injecting failures across a technology stack, including any suitable steps, which may include all, some, or none of the steps of the method of FIG. 7, where appropriate. Although FIG. 7 describes and illustrates particular components, devices, or systems carrying out particular actions, this disclosure contemplates any suitable combination of any suitable components, devices, or systems carrying out any suitable actions.

FIG. 8 illustrates an example computer system 800. In particular embodiments, one or more computer system 800 perform one or more steps of one or more methods described or illustrated herein. In particular embodiments, one or more computer system 800 provide functionality described or illustrated herein. In particular embodiments, software running on one or more computer system 800 performs one or more steps of one or more methods described or illustrated herein or provides functionality described or illustrated herein. Particular embodiments include one or more portions of one or more computer system 800. Herein, reference to a computer system may encompass a computing device, and vice versa, where appropriate. Moreover, reference to a computer system may encompass one or more computer systems, where appropriate.

This disclosure contemplates any suitable number of computer system 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer system 800; be unitary or distributed; span multiple locations; span multiple machines; span multiple data centers; or reside in a cloud, which may include one or more cloud components in one or more networks. Where appropriate, one or more computer system 800 may perform without substantial spatial or temporal limitation one or more steps of one or more methods described or illustrated herein. As an example and not by way of limitation, one or more computer system 800 may perform in real time or in batch mode one or more steps of one or more methods described or illustrated herein. One or more computer system 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer system 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a LAN, a WAN, a MAN, or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a 3G network, a 4G network, a 5G network, an LTE network, or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A controller, comprising:

one or more processors; and one or more computer-readable non-transitory storage media coupled to the one or more processors and comprising instructions that, when executed by the one or more processors, cause the controller to perform operations comprising:

generating a security policy, wherein the security policy represents a user, site, or application specific policy;

converting the security policy into a chaos hypothesis;

initiating execution of the chaos hypothesis across a plurality of microservices within a technology stack;

receiving metrics associated with the execution of the chaos hypothesis across the plurality of microservices within the technology stack, wherein the metrics represent sensor paths that are used to validate the chaos hypothesis; and determining, based on the metrics, whether the execution of the chaos hypothesis complied with the security policy.

2. The controller of claim 1, the operations further comprising communicating the chaos hypothesis to a plurality of full-stack observability (FSO) agents associated with the plurality of microservices.

3. The controller of claim 2, wherein the FSO agents comprise one or more of the following types of FSO agents:

endpoint agents;

enterprise agents;

end user monitoring (EUM) agents; and real user monitoring (RUM) agents.

4. The controller of claim 1, wherein:

initiating the execution of the chaos hypothesis across the plurality of microservices within the technology stack comprises communicating the chaos hypothesis to an endpoint agent with instructions to execute the chaos hypothesis across the plurality of microservices within the technology stack; and receiving the metrics associated with the execution of the chaos hypothesis across the plurality of microservices within the technology stack comprises receiving the metrics from the endpoint agent.

5. The controller of claim 1, the operations further comprising dynamically deriving different types of chaos hypotheses for observability and policy compliance.

6. The controller of claim 1, wherein the security policy is associated with one of the following actions:

denying a group of users access to an application;

denying site users access to a cloud application;

denying a transaction from a user to the application; or denying a group of users access to the application during business hours.

7. The controller of claim 1, wherein the chaos hypothesis comprises:

a type;

a name;

a steady state;

a hypothesis;

one or more execution actions;

one or more execution metrics; and execution logic.

8. A method, comprising:

generating a security policy, wherein the security policy represents a user, site, or application specific policy;

converting the security policy into a chaos hypothesis;

initiating execution of the chaos hypothesis across a plurality of microservices within a technology stack;

receiving metrics associated with the execution of the chaos hypothesis across the plurality of microservices within the technology stack, wherein the metrics represent sensor paths that are used to validate the chaos hypothesis; and determining, based on the metrics, whether the execution of the chaos hypothesis complied with the security policy.

9. The method of claim 8, further comprising communicating the chaos hypothesis to a plurality of full-stack observability (FSO) agents associated with the plurality of microservices.

10. The method of claim 9, wherein the FSO agents comprise one or more of the following types of FSO agents:

endpoint agents;

enterprise agents;

end user monitoring (EUM) agents; and real user monitoring (RUM) agents.

11. The method of claim 8, wherein:

initiating the execution of the chaos hypothesis across the plurality of microservices within the technology stack comprises communicating the chaos hypothesis to an endpoint agent with instructions to execute the chaos hypothesis across the plurality of microservices within the technology stack; and receiving the metrics associated with the execution of the chaos hypothesis across the plurality of microservices within the technology stack comprises receiving the metrics from the endpoint agent.

12. The method of claim 8, further comprising dynamically deriving different types of chaos hypotheses for observability and policy compliance.

13. The method of claim 8, wherein the security policy is associated with one of the following actions:

denying a group of users access to an application;

denying site users access to a cloud application;

denying a transaction from a user to the application; or denying a group of users access to the application during business hours.

14. The method of claim 8, wherein the chaos hypothesis comprises:

a type;

a name;

a steady state;

a hypothesis;

one or more execution actions;

one or more execution metrics; and execution logic.

15. One or more computer-readable non-transitory storage media embodying instructions that, when executed by a processor, cause the processor to perform operations comprising:

generating a security policy, wherein the security policy represents a user, site, or application specific policy;

converting the security policy into a chaos hypothesis;

initiating execution of the chaos hypothesis across a plurality of microservices within a technology stack;

receiving metrics associated with the execution of the chaos hypothesis across the plurality of microservices within the technology stack, wherein the metrics represent sensor paths that are used to validate the chaos hypothesis; and determining, based on the metrics, whether the execution of the chaos hypothesis complied with the security policy.

16. The one or more computer-readable non-transitory storage media of claim 15, the operations further comprising communicating the chaos hypothesis to a plurality of full-stack observability (FSO) agents associated with the plurality of microservices.

17. The one or more computer-readable non-transitory storage media of claim 16, wherein the FSO agents comprise one or more of the following types of FSO agents:

endpoint agents;

enterprise agents;

end user monitoring (EUM) agents; and real user monitoring (RUM) agents.

18. The one or more computer-readable non-transitory storage media of claim 15, wherein:

initiating the execution of the chaos hypothesis across the plurality of microservices within the technology stack comprises communicating the chaos hypothesis to an endpoint agent with instructions to execute the chaos hypothesis across the plurality of microservices within the technology stack; and receiving the metrics associated with the execution of the chaos hypothesis across the plurality of microservices within the technology stack comprises receiving the metrics from the endpoint agent.

19. The one or more computer-readable non-transitory storage media of claim 15, the operations further comprising dynamically deriving different types of chaos hypotheses for observability and policy compliance.

20. The one or more computer-readable non-transitory storage media of claim 15, wherein the security policy is associated with one of the following actions:

denying a group of users access to an application;

denying site users access to a cloud application;

denying a transaction from a user to the application; or denying a group of users access to the application during business hours.

* * * * *